United States Patent
Swierczewski

(10) Patent No.: US 9,994,131 B1
(45) Date of Patent: Jun. 12, 2018

(54) PREVENTIVE SELF-ADJUSTING STRUCTURE VEHICLE SEAT DESIGNED RESTRAINT

(71) Applicant: Richard Swierczewski, Toms River, NJ (US)

(72) Inventor: Richard Swierczewski, Toms River, NJ (US)

(*) Notice: Subject to any disclaimer, the term of this patent is extended or adjusted under 35 U.S.C. 154(b) by 0 days. days.

(21) Appl. No.: 15/843,425

(22) Filed: Dec. 15, 2017

(51) Int. Cl.
| | |
|---|---|
| *B62J 1/00* | (2006.01) |
| *B60N 2/42* | (2006.01) |
| *B60R 21/00* | (2006.01) |
| *B60N 2/427* | (2006.01) |
| *B60R 21/0132* | (2006.01) |
| *B60R 22/26* | (2006.01) |
| *B60R 21/01* | (2006.01) |
| *B60R 21/013* | (2006.01) |

(52) U.S. Cl.
CPC ......... *B60N 2/4279* (2013.01); *B60N 2/4221* (2013.01); *B60N 2/42736* (2013.01); *B60R 21/0132* (2013.01); *B60R 22/26* (2013.01); *B60R 2021/01252* (2013.01); *B60R 2021/01286* (2013.01); *B60R 2021/01311* (2013.01)

(58) Field of Classification Search
CPC ............... B60N 2/4279; B60N 2/4221; B60N 2/42736; B60N 2/427; B60N 2/42727; B60N 2/42754; B60N 2/42; B60R 21/0132; B60R 22/26; B60R 2021/01252; B60R 2021/01286; B60R 2021/01311
USPC .............................. 297/216.15–216.19, 216.2
See application file for complete search history.

(56) References Cited

U.S. PATENT DOCUMENTS

| | | | |
|---|---|---|---|
| 2,227,717 A | | 1/1941 | Jones |
| 3,081,059 A | | 3/1963 | Hastings et al. |
| 3,222,109 A | * | 12/1965 | Seward ................ B60N 2/707 267/89 |
| 3,697,128 A | * | 10/1972 | Strien .................. B60N 2/028 297/216.2 |
| 3,953,068 A | | 4/1976 | Porsche et al. |
| 4,275,914 A | | 6/1981 | Holweg et al. |
| 5,292,179 A | | 3/1994 | Forget |
| 5,344,204 A | | 9/1994 | Liu |
| 5,553,924 A | | 9/1996 | Cantor et al. |

(Continued)

FOREIGN PATENT DOCUMENTS

| | | |
|---|---|---|
| DE | 2112443 | 9/1971 |
| DE | 2060951 | 6/1972 |
| GB | 2087226 A | 5/1982 |

*Primary Examiner* — Mark R Wendell
(74) *Attorney, Agent, or Firm* — Walter J. Tencza, Jr.

(57) ABSTRACT

An apparatus or front row vehicle seat having portions A, B, C and D. The apparatus is adjustable by an occupant in its normal motionless position. When a vehicle electronic control unit senses a hazardous traffic situation, it causes activation of a seat actuator. In response, each of seat portions A, B, C, and D is simultaneously altered, without an occupants' action, to a new deployed position. The new deployed positions of the seat portions A, B, C, and D inhibit occupant ejection from a vehicle. The portions A, B and D of the apparatus are supported by front and rear stationary pillars and a middle movable pillar. The pillars project from a related unit seat height adjuster. The interaction of the rear stationary pillars with the portion D helps keep various seat components in the same orientation and position with respect to each other before and after deployment.

8 Claims, 12 Drawing Sheets

(56) References Cited

U.S. PATENT DOCUMENTS

| | | | |
|---|---|---|---|
| 5,556,160 A | 9/1996 | Mikani | |
| 5,605,372 A | 2/1997 | Al-Abdullateef | |
| RE35,572 E | 7/1997 | Lloyd et al. | |
| 5,743,592 A | 4/1998 | Tame | |
| 6,022,074 A | 2/2000 | Swedenklef | |
| 6,048,034 A * | 4/2000 | Aumont | B60N 2/1803 297/216.1 |
| 6,244,656 B1 * | 6/2001 | Mueller | B60N 2/4228 297/216.13 |
| 6,312,050 B1 * | 11/2001 | Eklind | B60N 2/4221 297/216.15 |
| 6,322,140 B1 * | 11/2001 | Jessup | B60N 2/4221 296/68.1 |
| 6,631,955 B2 | 10/2003 | Humer et al. | |
| 6,851,747 B2 | 2/2005 | Swierczewski | |
| 6,851,753 B2 * | 2/2005 | Akaike | B60N 2/1615 248/421 |
| 7,354,106 B2 | 4/2008 | Dennis | |
| 7,588,289 B2 | 9/2009 | Bostrom et al. | |
| 2003/0227204 A1 * | 12/2003 | Akaike | B60N 2/1615 297/330 |
| 2006/0061176 A1 * | 3/2006 | Sakai | B60N 2/1615 297/344.15 |
| 2009/0108645 A1 | 4/2009 | Nilakantan | |
| 2010/0066116 A1 * | 3/2010 | Coenen | B60N 2/4214 296/65.01 |
| 2011/0025106 A1 * | 2/2011 | Okamoto | B60N 2/1615 297/216.1 |
| 2011/0227378 A1 * | 9/2011 | Swierczewski | B60N 2/06 297/216.15 |
| 2013/0147241 A1 * | 6/2013 | Park | B60N 2/1615 297/216.1 |
| 2015/0300785 A1 * | 10/2015 | Lamparter | F41H 7/046 297/216.17 |
| 2017/0166095 A1 * | 6/2017 | Pleskot | B60N 2/0232 |

* cited by examiner

PREVENTIVE SELF-ADJUSTING STRUCTURE VEHICLE SEAT DESIGNED RESTRAINT

FIELD OF THE INVENTION

The present invention relates to a vehicle seat restraint device.

BACKGROUND OF THE INVENTION

A vehicle seat especially front row has been considered to absorb different forces, shocks and vibrations to enhance safety occupant onset extremely traffic condition. A numbers of practices are briefly described below by related patents: U.S. Pat. No. 6,631,955, issued Oct. 14, 2003, to Humer et al., discloses a variable movement headrest to provide head support to a vehicle occupant by quickly decreasing the gap between an occupant's head and the headrest. U.S. Pat. No. 7,588,289, issued Sep. 15, 2009, to Bostrom et al., discloses a vehicle seat having a headrest that moves forward in a manner depending on the severity of an impact.

U.S. Patent Application Publication No. 2009/0108645, published Apr. 30, 2009, by Nilakantan, teaches an active head restraint system that is actuated before an occupant is thrown rearward against a backrest. U.S. Pat. No. 6,022,074, issued Feb. 8, 2000, to Swedenklef, teaches a seat suitable for damping the effects of high-pressure impact against the seat backrest by occupant the seat, which seat includes a backrest element mounted on squab for pivotal relative movement to the squab. U.S. Pat. No. 7,354,106, issued Apr. 8, 2008, to Dennis, discloses a vehicle safety seat useful in aircraft and small sea-going vessels, in which a seated occupant is accelerated upward a fraction of a second after crash impact, thereby reducing downward velocity and avoiding compressive axial forces on the spine.

U.S. Pat. No. 5,553,924, issued Sep. 10, 1996, to Cantor et al., discloses a contoured seat bottom with an energy-absorbing foam layer covered by a second foam layer having a rate sensitive compression characteristic. U.S. Pat. No. 3,953,068, issued Apr. 27, 1976, to Porsche et al., discloses a passenger seat having a backrest pivotally attached to a seat rest in which energy absorption devices dissipate and absorb collision and/or deceleration forces acting on the seat or a passenger in the seat's. U.S. Pat. No. 5,556,160, issued Sep. 17, 1996, to Mikami, discloses a seat bottom that rotates from a seating position to an inclined position, in which the rear of the seat bottom is below the knees of a seated person, in order to prevent the seated person being flung forward by forces of inertia.

U.S. Pat. No. 6,851,747, issued Feb. 8, 2005, to Swierczewski, discloses a collapsible vehicle safety seat designed upon impact to lower the center of gravity of an occupant. U.S. Pat. No. Re. 35,572 issued on Jul. 29, 1997 to Lloyd et al. discloses a seat assembly for a motor vehicle that includes an air suspension system for isolating the occupant of the seat from shock, vibration and inertial forces directed along both vertical and horizontal axes. A base plate is mounted to the floor of the vehicle and supports first and second pairs of sleeve bearings on opposed sides of a box-like housing. The housing is attached to a pair of guide rods, which cooperate with the sleeve bearings to provide fore and aft movement of the housing. Springs operating in cooperation with a first horizontally disposed air bag serve to dampen out inertial forces to the vehicle seat. The seat itself is supported on a vertically oriented air spring and a plurality of hydraulic vibration dampeners that tend to cushion vertically directed forces acting upon the seat and its occupant.

U.S. Pat. No. 2,227,717 issued on Jan. 7, 1941 to Jones relates to structure for mounting a chair to the body of an airplane. The structure is designed to move the chair forward and upward in the event of collision, whereby the person occupying the chair will be tossed in a curved path and thus relieved substantially from shock caused by the collision forces. U.S. Pat. No. 3,081,059 issued on Mar. 12, 1963 to Hastings et al. is drawn to a seat base having an inverted cone secured to the underside of the seat. The front legs of the seat are pivotally mounted to the floor of the vehicle. A single rear leg telescopes against the action of a spring. U.S. Pat. No. 4,275,914 issued on Jun. 30, 1981 to Holweg et al., discloses an arresting device in a longitudinally adjustable guide rail assembly for motor vehicle seats. The device includes a shaft rotatable supported in a stationary bearing plate and driven by a stationary electromotor. The driving pinion of the electromotor is in mesh with an intermediate gear, which is supported for joint rotation on the shaft. A coupling disk is supported for joint rotation on the shaft and for axial displacement between the bearing plate and the face of an intermediate gear.

U.S. Pat. No. 5,292,179 issued on Mar. 8, 1994 to Forget, discloses a fixed plate supporting a vehicle seat that is secured to longitudinal adjusting slides. The fixed plate supports a rotary intermediate plate via a first ball bearing and a cover rigidly connected to the fixed plate and supported at the rotary intermediate plate via a second ball bearing. U.S. Pat. No. 5,344,204 issued on Sep. 6, 1994 to Liu, discloses a safe driver seat unit that includes a seat supported on two rails by four ball bearings mounted in the seat legs, and an arrangement wherein an electromagnetic controller locks the seat in normal position. In a collision, sensors will turn on power to unlock the seat so that springs may move the seat backwardly. U.S. Pat. No. 5,605,372 issued on Feb. 25, 1997 to Al-Abdullateef, discloses an automotive safety seat that reduces g-loads imparted to an occupant during a collision by absorbing some of the energy of impact. Kinetic energy is converted to potential energy with the elevation of the seat and its occupant and the compression of springs'.

U.S. Pat. No. 5,743,591 issued on Apr. 28, 1998 to Tame, discloses a vehicle seat, which includes a seat cushion assembly and a hydraulic actuator. A first mounting assembly is constructed and arranged to mount the seat cushion assembly on a vehicle floor, and a second mounting assembly is provided which is constructed and arranged to mount a seat back assembly on the seat cushion assembly. U.S. Pat. No. 6,851,747 issued on Feb. 8, 2005 to the present inventor teaches a collapsible vehicle safety seat supported on a pilotable linkage. On vehicle impact or a signal indicating imminent impact, the linkage releases to drop the vehicle seat and the occupant to an angled position, reducing movement due to high deceleration forces.

German Patent No. 2,112,443 published Sep. 23, 1971, discloses a vehicle passenger safety system which has seat belt anchorages and/or the seat rear anchorage points attached through energy absorbing components so that each passenger describes a predetermined path within the compartment with an increasing braking force until suitable padding brings the passenger to a safe stop. German Patent No. 2,060,951 published Jun. 22, 1972, discloses a car seat that is mounted on a spring-loaded support to absorb impact forces. The support is braced by either mechanical springs or hydraulic shock absorbers, and converts impact forces into a smooth recoil to protect the occupants in the event of a collision. Great Britain U.S. Pat. No. 2,087,226A published May 26, 1982, discloses a shock absorbing seat that is formed by two connected portions. The shorter rear portion is a flat metal sheet bent upwardly at the back and riveted to the rear cross-member of a tubular support frame.

Automakers meets or outreaching regulations dictate by federal safety standards however race to autonomous and connectivity vehicles generates new possibilities for more efficient and affordable restraint system. Industry included Autonomous Driver Assistance System (ADAS) companies recognized traditionally seat belts and air bags as a major restraint system despite their inconvenience and limited safety performance. Seat belt doesn't protect occupants head, neck and lower extremities; air bags generates aggressiveness forces and lack visibility besides others technical difficulties reflected to manufacturers financial problem. Lowering rear region siting area about 17 degrees' or more is reasonable solution but according to Annual Automotive Seating Innovators Summit 2017 increases occupants discomfort. Industry needs inexpensive and lightweight vehicle seat transferring loads that provides to consumer's greatest comfort and ergonomic onset normal driving condition and minimizing interface occupants versus seat during extremely traffic scenario. Intelligent vehicle front seat capable to preventive self-adjusting seat bottom and backrest simultaneously with energized by collision avoidance system seat actuator resolve conflicting demands. Comparing sled test at independent facilities proof that opposite to conventional seat the self-adjustable vehicle seat preventing ejection of occupants from outboard security position much better than any conventional seat on the current worldwide marketplace. Seat structure is easily home to original position conveniently decided by occupant prior development. Presented intelligent front row vehicle seat is proof-of-concept solution for all passenger's cars especially autonomous and connected vehicles. Intelligent preventive self-adjusting vehicle seat guarantee developer growth profitability by influence potential car buyers' decision and undeniable advantages over competitors.

SUMMARY OF THE INVENTION

In at least one embodiment, an apparatus is provided comprising a seat bottom frame which includes a first portion, a second portion, a third portion; and a backrest portion. The apparatus may further include a left front pillar; a right front pillar; a left rear pillar; and a right rear pillar; a left front unit seat height adjuster; a right front unit seat height adjuster; a left rear unit seat height adjuster; a right rear unit seat height adjuster; a middle unit seat height adjuster; and an adjustable middle pillar.

In at least one embodiment, the first portion is pivotally connected to the left and right front pillars; the second portion is pivotally connected to the first portion; the third portion is pivotally connected to the second portion; and the second portion is detachably connected to the backrest portion.

In at least one embodiment, the left front pillar and the right front pillar are spaced apart from each other; the left front pillar is fixed to the left front unit seat height adjuster at an orientation and at a position; the right front pillar is fixed to the right front unit seat height adjuster at an orientation and at a position; the left rear pillar is fixed to the left rear unit seat height adjuster at an orientation and at a position; the right rear pillar is fixed to the right rear unit seat height adjuster at an orientation and at a position; and the middle unit seat height adjuster is detachably connected to the adjustable middle pillar.

In at least one embodiment, the apparatus includes a seat actuator; the adjustable middle pillar has an upper end and a lower end; the upper end of the adjustable middle pillar is pivotally connected to a first end of the first portion; and the lower end of the adjustable middle pillar is detachably connected with the housing.

In at least one embodiment, when the lower end of the adjustable middle pillar is connected to the housing, the adjustable middle pillar is substantially perpendicular to a length of an elongated member of horizontal seat adjuster, and the apparatus is in a normal seat state.

In at least one embodiment, the seat actuator when energized causes the adjustable middle pillar to detach from the housing, and to move into a dislocation state where the adjustable middle pillar is substantially angled with respect to a member of the horizontal seat adjuster.

In at least one embodiment, the seat actuator is in communication with an electronic control unit, and the seat actuator is energized by a command signal from the electronic control unit in response to a high hazard traffic scenario, such as including a rapid deceleration of a vehicle.

The electronic control unit may communicate with an emergency braking autonomous system, an ergonomically located push button, and an audio notification transducer.

In at least one embodiment, the middle pillar is detached from the housing by causing a rigid shaft pin to withdraw from an opening of the housing and from an opening of the lower end of the adjustable middle pillar.

In at least one embodiment, the first portion includes a front cross bar, a left middle cross bar, a right middle cross bar. The second portion may include a rear cross bar; and wherein the front cross bar is configured to permit the first portion and the second portion to change in orientation from the normal state to the dislocation state.

The rear cross bar may have a convex shaped portion which allows separation of the second portion from the backrest portion.

The apparatus may be further comprised of a left frame member with a left convex portion, a right frame member with a right convex portion, a left stationary pillar, a right stationary pillar, a left recliner stabilizer, and a right recliner stabilizer; wherein the left frame member has an end convex which fits into a concave portion of left rear stationary pillar and a concave portion of left recliner stabilizer; and wherein the right fame member has a convex end which fits into a right rear stationary pillar concave end and a right recliner stabilizer concave end.

In at least one embodiment, and apparatus is provided comprising a left backrest adjuster having an upper end and a lower end; and a right backrest adjuster having an upper end and a lower end; a left backrest frame; a right backrest frame; a left stabilizer plate; a right stabilizer plate; a left rear stationary pillar; a right rear stationary pillar; a left seat belt anchor; and a right seat belt anchor; wherein the upper end of the left backrest adjuster is fixed to the left backrest frame; wherein the upper end of the right backrest adjuster is fixed to the right backrest frame; wherein the lower end of the left backrest adjuster forming the left track stabilizer plate detached from left rail rear stationary pillar; wherein the lower end of the right backrest adjuster forming the right track stabilizer plate detached from right rail rear stationary pillar; wherein the left seat belt anchor is fixed to the left stabilizer plate; and wherein the right seat belt anchor is fixed to the right stabilizer plate.

DETAILED DESCRIPTION OF THE DRAWINGS

Figure 1:
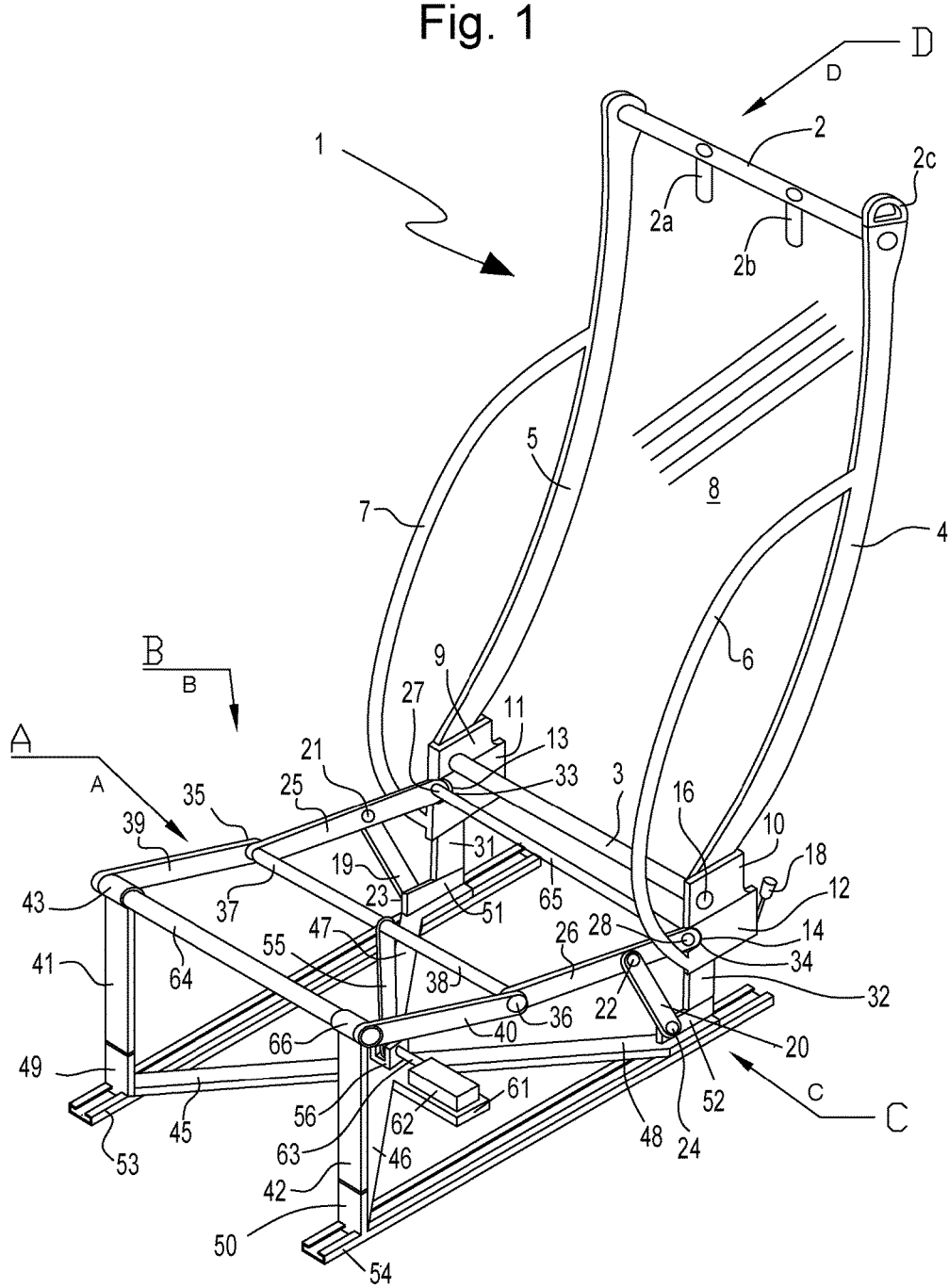
FIG. 1 shows a front, right, and top schematic perspective view of an apparatus in accordance with an embodiment of the present invention with the apparatus in a normal position.
Figure 3:
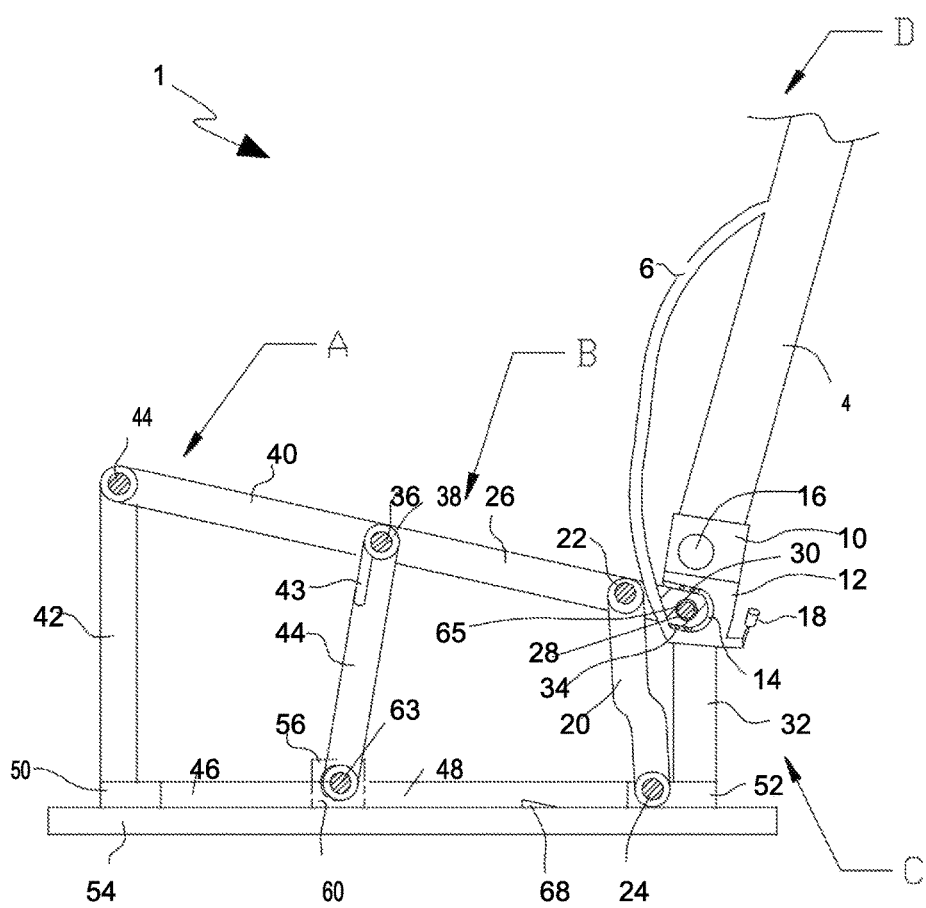
FIG. 3 is a schematic side view of various seat components of the apparatus of FIG. 1, with the apparatus of FIG. 1 in its normal position.

FIG. 1 shows a front, right, and top perspective view of an apparatus 1. The apparatus 1 includes vehicle front row vehicle seat components, such as for an automobile. The apparatus 1 is shown in normal position or in a normal state in FIG. 1 in accordance with an embodiment of the present invention. Related FIG. 3 shows one side view of various components of the apparatus 1 in the normal position or the normal state in which it may be placed conveniently by an occupant. Portions A, B, and D of the apparatus 1 are shown in FIG. 1.

Referring to FIG. 1, the apparatus 1 includes various left components which are typically given odd reference numbers and various right components which are typically given even reference numbers. The apparatus 1 includes seat backrest upper horizontal cross bar 2 having flanges 2a and 2b for head restraint (not shown) and opening 2c for traveling seat belt. The apparatus 1 further includes left seat back vertical frame 5 associated with left curve frame 7, right seat back vertical frame 4 associated with right curve frame 6, backrest area 8, lower horizontal cross bar seat back 3, left seat recliner 9, right seat recliner 10, left seat recliner stabilizer plate 11, right seat recliner stabilizer plate 12, left stabilizer plate concave 13, right stabilizer plate concave 14, recliner left torsion spring 15, recliner right torsion spring 16, left belt anchor 17, right belt anchor 18, third left frame 19, third right frame 20, left upper rear pivot 21, right upper rear pivot 22, left lower rear pivot 23, right lower rear pivot 24, left second frame 25, right second frame 26, left second frame convex 27, right second frame convex 28, left stabilizer plate concave 29 right stabilizer plate concave 30, left rear stationary pillar 31, right rear stationary pillar 32, left rear stationary pillar concave 33, right rear stationary pillar concave 34, left second cross bar 35, right second cross bar 36, left middle pivot 37, right middle pivot 38, first left frame 39, first right frame 40, left front stationary pillar 41, right front stationary pillar 42, left front upper pivot 43, right front upper pivot 44, left front X-shape shaft 45, right front X-shape shaft 46, left rear X-shape shaft 47, right rear X-shape shaft 48, left front unit seat height adjuster 49, right front unit seat height adjuster 50, left rear unit seat height adjuster 51, right rear unit seat height adjuster 52, left member seat longitudinal adjuster 53, right member seat longitudinal adjuster 54, single middle movable pillar 55, lower end movable pillar housing 56, lower end movable pillar opening 57, upper movable pillar pivot 58, movable pillar torsion spring 59, movable pillar housing opening 60, actuator base 61, linear seat actuator 62, actuator shaft 63, front cross bar 64, rear cross bar 65, right anti-friction ball bearing 30 of right convex 28, left anti-friction ball bearing 29 of left convex 27, left stopper 67 and right stopper 68.

The left concave 13 of left recliner stabilizer plate 11 comes together with left concave 33 of left rear stationary pillar 31 to fit left convex 27 of second left frame 25. Additionally, the right concave 14 of the right recliner stabilizer plate 12 comes together with the right concave 34 of the right rear stationary pillar 32 to fit the right convex 28 of the second right frame 26. The middle left pivot 35 of the left second cross bar 37 joins first left frame 39 with second left frame 25. The middle right pivot 36 of right second cross bar 38 joins first right frame 40 with second right frame 26. The front left pivot 43 joins left front stationary pillar 41 with the first left frame 39. The front right pivot 44 joins right front stationary pillar 42 with first right frame 40. The rear left upper pivot 21 joins left third frame 19 with second left frame 25. The rear left lower pivot 23 joins left third frame 19 with rear seat high adjuster left unit 51. The rear right upper pivot 22 joins left right third frame 20 with second right frame 26. The rear right lower pivot 24 joins right third frame 20 with rear seat adjuster right unit 52. Alternatively, a portion C' may be formed by fabric or synthetic material 66 in the apparatus 100 of an embodiment shown in FIGS. 11-12, instead of the left third frame 19 with upper pivot 21 and lower pivot 23 and the right third frame 20 with upper pivot 22 and lower pivot 24. The fabric or synthetic material 66 is connected to lower cross bar 3 of the portion D by the rear cross bar 65 of the portion B. During normal seat position for the apparatus 100 of FIG. 11, the fabric or synthetic material 66 is folded and hides under seat portion B. The upper end vertically positioned middle movable single pillar 55 developing torsion spring 59. The lower end movable single pillar 55 is non-permanently engaged into housing 56 situated on X-shaped component 61. The lower end movable single pillar 55 having opening 57 synchronized with housing opening 60 to fit actuator rigid shaft 63.

The apparatus 1 includes an X-shape or X-shaft including the front left member 45, the front right member 46, the rear left member 47 and the rear right member 48. The front left X-shaped member 45 is conventionally fastened to the front left unit seat height adjuster 49. The front right X-shape member 48 is conventionally fastened to the front right unit seat height adjuster 50. The rear left X-shaped member 47 is conventionally fastened to the rear left unit seat height adjuster 51. The rear right X-shaped member 48 is conventionally fastened to the rear right unit seat height adjuster 52. During normal seat position the actuator rigid shaft 63 causes the housing 56 tightly hold lower end movable pillar 55. The rear edge second right frame 26 includes right convex 28. The right convex 28 non-permanently engages right concave 14 of right recliner stabilizer plate 12 and concave 34 of right rear stationary pillar 32. The left convex 27 of second left frame 25 non-permanently engages left concave 13 of left recliner stabilizer plate 11 and left concave 33 of rear stationary left pillar 31. The left recliner 9 is permanently conventionally connected to backrest left frame 5 associated with curve left member 7. Apparatus right recliner 10 is permanently conventionally connected to the backrest right frame 4 associated with the curve right member 6.

The left stabilizer plate 11 includes left concave 13. The right stabilizer plate 12 includes right concave 14. The rear stationary left pillar 31 is connected to and projects upward from rear left unit seat height adjuster 51. The rear stationary right pillar 32 is connected to and projects upward from rear right unit seat height adjuster 52. The upper end rear stationary left pillar 31 includes the left concave 33. The upper end rear stationary right pillar 32 includes the right concave 34. The lower edge third left frame 19 having left lower rear pivot 23 connected with left rear unit seat height adjuster 51. The lower edge third right frame 20 is connected by the right lower pivot 24 to the right rear unit seat height adjuster 52. The left convex 27 of second left frame 25 comes together with the left concave 13 of left rear stationary pillar 11 and the left concave 33 of the left rear stationary pillar 31. The right convex 28 of the second right frame 26 fits the right concave 14 of the rear right recliner stabilizer plate 12 and the right concave 34 of the rear right stationary pillar 32. The interaction right convex 28 of the second right frame 26 with concave 14 of stabilizer plate 12 of recliners 10 and corresponding concave 34 of rear stationary pillars 32 prevents unexpected motion of various portions of the apparatus 1 and the backrest area 8 during normal seat position of the apparatus 1. The apparatus 1 has a single linear actuator 62 situated on base member 61. The size of the actuator 62, stroke length, speed and force, in at least one embodiment is predetermined depending on the particular vehicle that the apparatus 1 will be installed in. The actuator rigid shaft 63 fits opening 57 of lower end single movable pillar 55 and opening 60 of housing 56 to guarantee motionless seat which can be conveniently adjusted by occupants.

The effectiveness of the apparatus 1 is intensified by a biasing means, such as a radial tangential spring 59 located on the upper end single movable pillar 55. The apparatus 1 is built by lightweight materials to withstand compressive and tensile strength preventing deformation of components of the apparatus 1. The ability to adjust portions A and B shown in FIG. 1 of the apparatus 1, causes loads to be transferred to an absorbing deceleration pulse applied on all-regions of the occupant's body to deal with vehicle unexpected rising deceleration forces. The new location first portion seat bottom A creates a natural obstacle preventing an occupant's ejection. Contrary to prior known vehicle seats that discontinue an occupant's visibility by deployed air bags, the apparatus 1 provides decent vision regardless of lowering occupants H-point or hip point (i.e. the location of an occupant's hip, or the pivot between upper leg and torso). Alternatively, downward movement of the backrest 8 from an original location to an anticipated securely locked position could be accelerating by biasing means (not shown). The constant relation deployed backrest 8 with first portion seat bottom A and second portion seat bottom B prevents an occupant sitting in the apparatus 1, from submarining. The deployed apparatus 1 could easily return to home configuration. The efficiency of the apparatus 1 is improved by a single torsion radial spring 59 positioned on the upper end movable single pillar 55. The left recliner stabilizer plate 11 of the left recliner 9 and the right recliner stabilizer plate 12 of the right recliner 10 are able to slide vertically down over corresponding left rear stationary pillar 31 and right rear stationary pillar 32 acting as a rail. Related FIG. 3 show the right side schematic view of seat portions A, B and C and backrest D at an uppermost possible position elected by an occupant before activation of the seat actuator 62.

Figure 2:
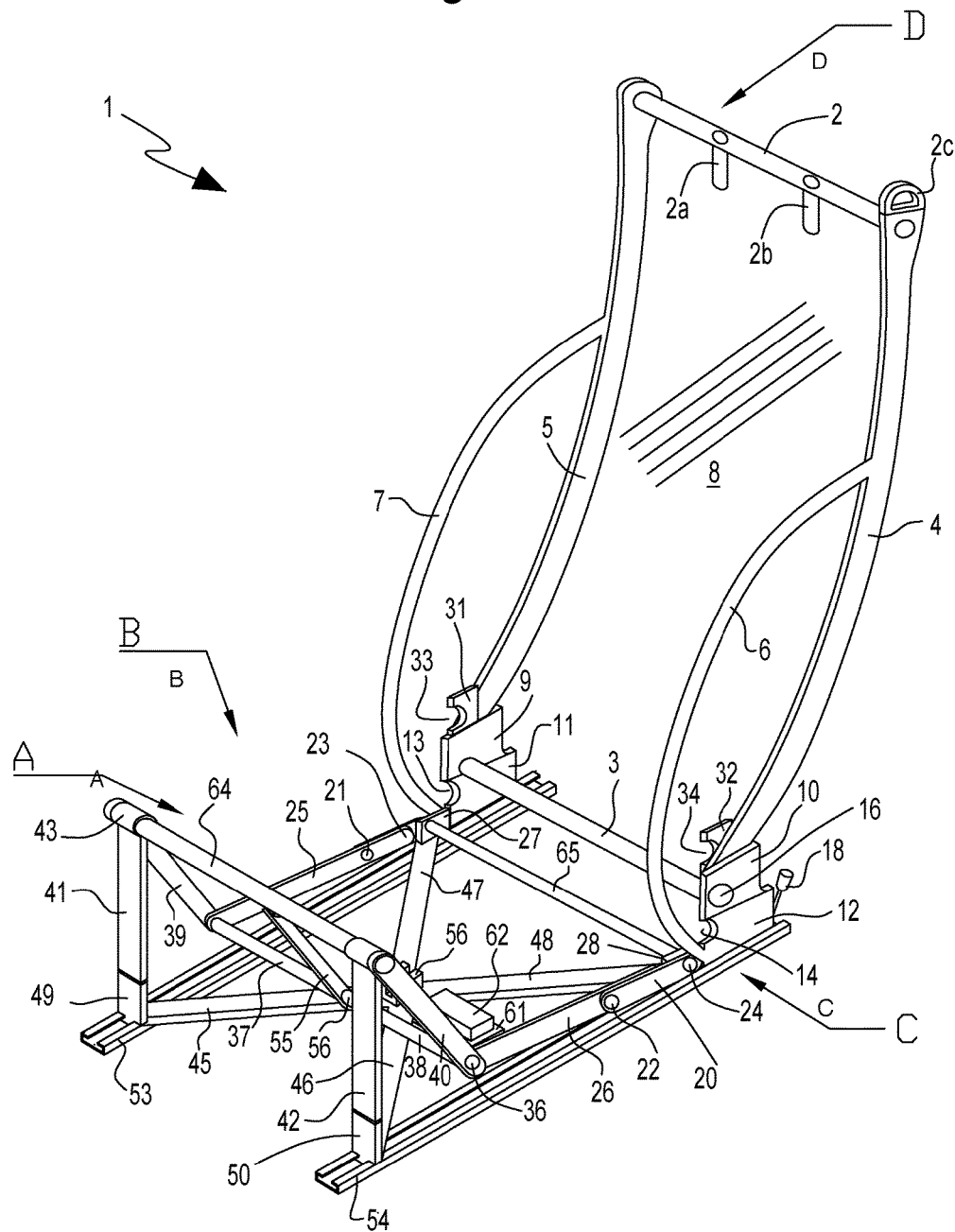
FIG. 2 is a front, right, and top schematic perspective view of the apparatus in a deployed position.
Figure 4:
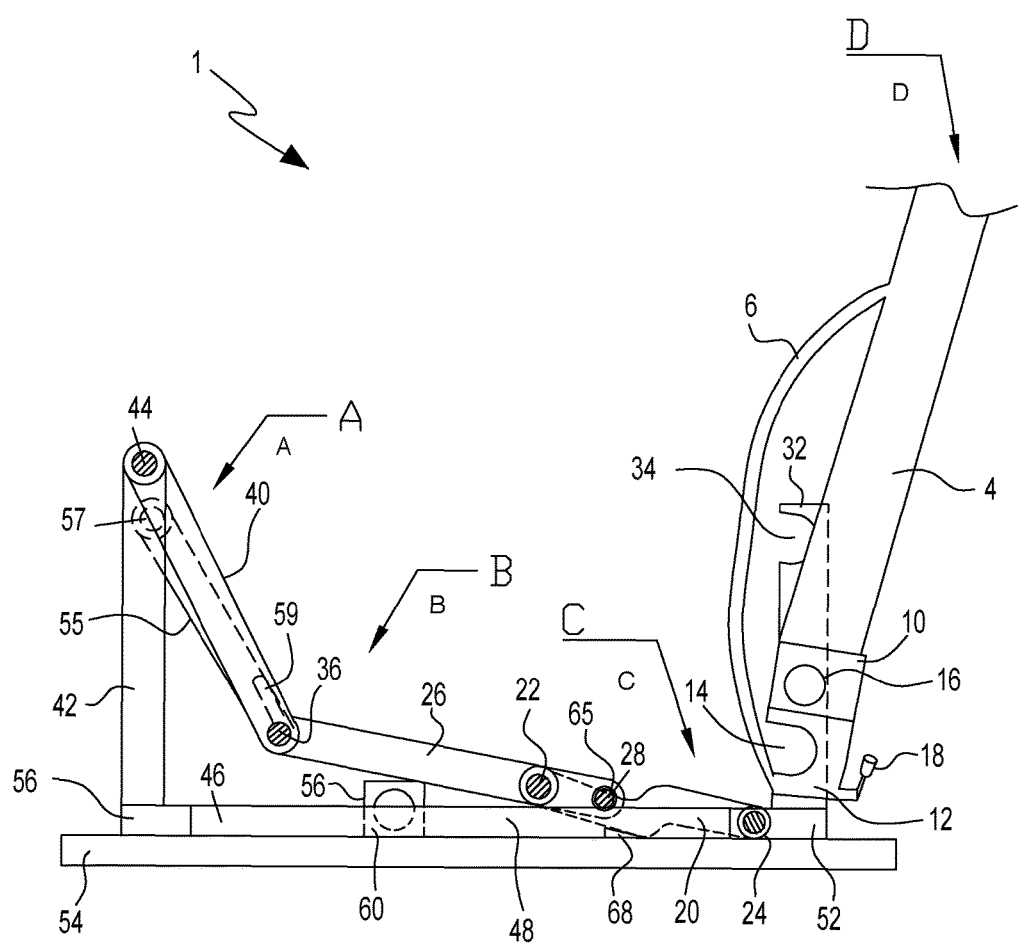
FIG. 4 is a schematic side view of a various components of the apparatus of FIG. 1, with the apparatus of FIG. 1, in its deployed position.

FIG. 2 shows a perspective view of the apparatus 1 in its deployed configuration. Related FIG. 4 illustrates a schematic one side view of the apparatus 1 in its deployed orientation. Simultaneously with a hazard traffic scenario detected by an avoiding crash sensing devices, a command signal is transmitted to the electronic control unit (ECU) 69 to energize the linear seat actuator 62. Energized linear seat actuator 62 pulls out r shaft 63 from opening 60 located into the housing 56 and synchronized opening 57 located into the lower end single movable pillar 55. Simultaneously, the single movable pillar 55 changes its original vertical position to deployed configuration. Simultaneously, the single movable pillar 55 change its original vertical position to deployed configuration. Dislocation of the movable pillar 55 causes anticipated simultaneously movement in a downward and forward direction combination of the all portions seat bottom. The first portion seat bottom A is forced to slope down up to ninety degrees.

The slant length first portion seat bottom A is equal or less than each of the heights of the front stationary left pillar 41 and the right pillar 42. Movement of the first portion seat bottom A causes concurrently dislocation of the second portion seat bottom B and the third portion seat bottom C and D portion backrest. Seat bottom or portion A includes left first frame 39, right first frame 40, left second cross bar 37 and right second cross bar 38. Seat portion B includes left convex 27 of second left frame 25, right convex 28 of right second frame 26, left second cross bar 37 and right second cross bar 38. Seat portion C includes left third frame 19, right third frame 20, and third cross bar 65. The movement of the second portion seat bottom B causes simultaneously disengagement of the left convex 27 of second left end frame 25 from the left concave 13 of left recliner stabilizer plate 11 and from left concave 33 of rear stationary left pillar 31. Concurrently, the right convex 28 of second right frame 26 is disengaged from right concave 14 of right recliner stabilizer plate 12 and from the right concave 34 of the rear stationary right pillar 32. Movement of the second portion seat bottom B causes the third portion seat bottom C to rotate from a vertical to horizontal orientation. The anticipated pre-emptive displacement of all of portions A, B and C generates additional inertial and gravitation forces restraining occupant's kinematics.

The anticipated downward movement of the backrest D in direction indicated by arrow D guarantees consistent relation of the head restraint and the seat belt and to new deployed secured location seat bottom portions A, B and C. The first portion seat bottom A is capable of rotating downward up to ninety degrees in direction indicated by arrow A. Simultaneously the second portion seat bottom B is forced to move in a combined forward and downward in direction indicate by arrow B. Concurrently the third portion C is forced to rotate from vertical orientation to horizontal position in direction indicate by arrow C. The length of first portion A is determined by heights of the left front stationary pillar 41 and the right front stationary pillar 42. The movement of the second portion B allows the portion C to rotate from vertical orientation to horizontal over left lower rear pivot 23 and right lower rear pivot 24. The portion D has freedom to move downward over corresponding rear left stationary pillar 31 and rear right stationary pillar 32. The downward movement of the portion D guarantees consistent relation new location backrest with associated head restraint and seat belt (not shown) with anticipated new locations of portions A, B and C. The horizontal seat left adjuster 53 includes a left stopper 67. The horizontal seat right adjuster 54 includes a right stopper 68. The stoppers left 67 and right 68 prevent bouncing of the corresponding frames 25 and 26 and guarantee motionless portions A, B and C in anticipated deployed location. The backrest portion D remain at same angle with respect to floor pan conveniently desired by seat occupants before seat deployment. The constant relation of the backrest portion D, shown in FIG. 2, with the new location portions A, B and C preventing occupant's submarine. The effectiveness of the apparatus 1 is improved by a biasing means, such as for example, radial tangential spring 59 located on the upper end of the movable pillar 55. FIG. 4 shown a right side schematic view anticipated positions of the seat portions A, B and C and the backrest D as a result of energized seat actuator 62.

The front row vehicle seat apparatus 1 comprised three distinctive portions or seat bottom portions A, B, and C and backrest portion D capable of pre-emptive self-adjusting simultaneously with uncontrolled sudden rise of vehicle deceleration forces. Each of portions A, B, C, and D, in at least one embodiment, may be separately constructed as a solid plate or net fabricated by lightweight material most likely aluminum or plastic composite covered separately by proper density foam and topped by fabric or leather. During seat normal position or state, all portions A, B, C, and D are secured motionless state conveniently adjusted by an occupant. The horizontally positioned first portion seat bottom A is formed by front cross bar 64, left first frame seat bottom 39, right first frame seat bottom 40, left part second cross bar 37, and right part second cross bar 38. The horizontally positioned second portion seat bottom B is formed by the left second cross bar 37, the right second cross bar 38, the right second frame seat bottom 25 and the left second frame seat bottom 26. The rear edge second portion seat bottom B is formed by third cross bar 65. The vertically situated third portion seat bottom C is formed as a solid plate or net (not shown) by the left third frame seat bottom 19 and the right third frame seat bottom 20. Alternatively, the portion C' is formed by fabric or synthetic material 66, shown in FIGS. 11-12, instead of the left third frame 19 with upper pivot 21 and lower pivot 23 and right third frame 20 with upper pivot 22 and lower pivot 24. The fabric or synthetic material 66 is connected to the rear cross bar 65 of the portion B by the lower cross bar 3 of the portion D. The fabric or synthetic material 66 becomes visible, straight, and functional simultaneously with the activation or energization of the seat actuator 62. The vertically positioned backrest portion D is formed by upper cross bar 2, lower cross bar 3, right frame backrest 4 associated with right curve frame 6 and left frame backrest 5 associated with the left curve frame 7. The first portion seat bottom or portion A and the second portion seat bottom B are positioned quasi parallel in respect to the floor pan. The third portion seat bottom C is positioned vertically in respect to the floor pan. During normal seat orientation the third portion seat bottom C does not participate in an occupant's setting. Lowest as possible fastened seat longitudinal adjuster left member 53 and right member 54 to floor pan improve efficiency of the apparatus 1 through utilizing wasted room more productively than all prior known vehicle seats to increase the heights all of seat pillars. The horizontally positioned front cross bar 64 is rotatably mounted to the left front pivot pin 43 which is permanently connected to the left first seat bottom frame 39 and the left front stationary pillar 41. The horizontally positioned front cross bar 64 is rotatably mounted to the right front pivot 44 which is permanently connected to the right first seat bottom frame 40 and the stationary right front pillar 42. The front left pivot 43 joins upper end vertically situated front stationary left pillar 41 with horizontally positioned first left seat bottom frame 39. The front right pivot 44 joins the upper end vertically situated front stationary right pillar 42 with the horizontally positioned first right seat bottom frame 40. The lower end front stationary left pillar 41 is permanently conventionally mounted to the front left unit seat height adjuster 49. The lower end front stationary right pillar 44 is permanently conventionally mounted to the front right unit seat height adjuster 50. The lower end rear stationary left pillar 31 is permanently conventionally mounted to rear left unit seat height adjuster 51. The lower end rear stationary right pillar 32 is permanently conventionally mounted to rear right unit seat height adjuster 52.

The left middle pivot pin 35 is rotatably mounted to the left second cross bar 37 and joins the left first seat bottom frame 39 with the second left seat bottom frame 25. The right middle pivot pin 36 is rotatably mounted to the right second cross bar 38 and joins the right first seat bottom frame 40 with the second right frame 38. The upper end movable single pillar 55 includes a torsion spring 59. The lower end movable single pillar 55 is non-permanently located or attached onto housing 56 situated on the base 61. The movable single pillar 55 lower end has an opening 57. The housing 56 has opening 60. Both opening 57 and opening 60 are synchronized to fit one movable rigid shaft 63 controlled by single linear seat actuator 62. The apparatus 1 includes X-shaped base shafts comprising front left cross shaft 45, front right cross shaft 46 rear left cross shaft 47 and rear right cross shaft 48. The X-shape front left cross shaft 45 is permanently conventionally connected with the front left unit seat height adjuster 49. The X-shape front right cross shaft 46 is permanently conventionally connected with front right unit seat height adjuster 50. The X-shape rear left cross shaft 47 is permanently conventionally connected with rear left unit seat height adjuster 49. The X-shape rear right cross shaft 48 is connected to the rear right unit seat height adjuster 52. The single movable pillar 55 lower end having opening 57 matched to opening 60 located in housing 56 to fit actuator shaft 63. During the normal seat position or state, the actuator shaft 63 tightens or clamps the housing 56 to the lower end movable pillar 55. The left second bottom frame 25 end includes the left convex 27. The left convex 27 has a left anti-friction ball bearing 29. The left convex 27 is non-permanently engaged in concave 13 forming by left recliner 9 stabilizer plate 11. The left convex 27 is non-permanently engaged in concave 33 of left rear stationary pillar 31. The right second bottom frame 26 end includes the right convex 28. The right convex 28 has right anti-friction ball bearing 30. The right convex 28 is a non-permanently engaged concave 14 formed by right recliner 10 and stabilizer plate 12. The right convex 28 non-permanently conventionally engages the right concave 34 with right rear stationary pillar 32. The rear stationary right pillar 32 projects upwards from rear right unit seat height adjuster 52. The rear stationary left pillar 33 projects upwards from the rear left unit seat height adjuster 53. The upper end left rear stationary pillar 32 includes the right concave 34. The upper end rear stationary left pillar 31 includes left concave 33. The horizontally positioned rear third cross bar 65 is rotatably mounted to the rear left lower pivot pin 23 and the rear right lower pivot pin 24. The left lower pivot pin 23 is connected permanently to lower end vertically positioned third left seat bottom frame 19 with the rear left unit seat height adjuster 51.

The right lower pivot 24 permanently connects the lower end vertically positioned third right seat bottom frame 20 with the right unit seat height adjuster 52. The interaction of convex structures with concave structures prevents undesirable and unexpected movement of each of portions A, B, C, and backrest D during normal seat actuator 62 energized by vehicle collision avoidance system most likely concurrently with autonomous emergency braking (AEB) 71. The actuator 62 size, stroke length, speed and force is predetermined for particular vehicle seat. When the actuator 62 is not on or not energized, the rigid shaft 63 clamps the housing 56 onto the single movable pillar 55. Simultaneously when the actuator 62 is turned on or energized, this causes the rigid shaft 63 to pull out from the synchronized opening 57 of housing 56 and the opening 60 of the movable pillar 55. This causes, the movable pillar 55 to alter its original vertical position to deployed configuration.

The effectiveness of the apparatus 1 is improved by biasing means, such as for example, radial tangential spring 59 located on the upper end movable pillar 55. Dislocation of the movable pillar 55 causes anticipated simultaneously movement downward and forward of the first portion seat bottom A. The first portion seat bottom A is forced to slope down to an angle of up to ninety degrees. Moving the first portion seat bottom A causes simultaneous or substantially simultaneous dislocation of the second portion seat bottom B, the third portion seat bottom C and the backrest D. The motion of the second portion seat bottom B causes disengagement simultaneously of the right convex 28 of second right frame 26 from the right concave 34 of right rear stationary pillar 32 and the right concave 14 of the right recliner stabilizer plate 30. The motion of the second portion seat bottom B causes disengagement simultaneously of the left convex 27 of second left frame 25 from the left concave 13 of the left recliner stabilizer plate 29 and the left concave 33 of the rear left stationary pillar 31. Movement of the second portion seat bottom B causes rotation of the third portion seat bottom C from vertical to horizontal orientation. The anticipated pre-emptive displacement of all of portions of seat bottoms A, B, and C generates additional inertial and gravitation forces restraining occupant's kinematics. The downward movement backrest D to new adjustable location and portions A, B and C guarantee consistent relation before, during and after deployment. The apparatus 1, in at least one embodiment, is fabricated by lightweight materials to withstand compressive and tensile strength that prevent seat deformation. The downward movement of the first and second portion seat bottom portions A and B causes transferring of coordinate loads absorbing deceleration pulse applying on all-region of an occupant's body addressing unexpected rising vehicle deceleration forces. The new location of the first portion seat bottom A creates a natural obstacle preventing an occupant's ejection. Contrary to prior known existing seats that discontinue occupant's visibility by deployed air bags the apparatus 1 provides decent vision regardless of lowering occupants H-point (hip point) during extreme traffic conditions. Alternatively accelerating downward movement of backrest D from the original location to anticipated securely locked position is increases by biasing means (not shown). The constant relation of each of portions A, B and C versus backrest D prevent occupants from submarining. The apparatus 1 return to home configuration shown in FIG. 1 by simply concurrently lift up second portion B with lift up portion D and lock up movable pillar 55 into housing 56 by shaft 63 of non-energized actuator 62. The apparatus 1 provides synchronized stoppers left 69 and right 68 to prevent bouncing of deployed seat components in state. The apparatus 1 represents a proof-of-concept supplemental restraint system for all passenger cars especially autonomous and connectivity vehicles.

Figure 5:
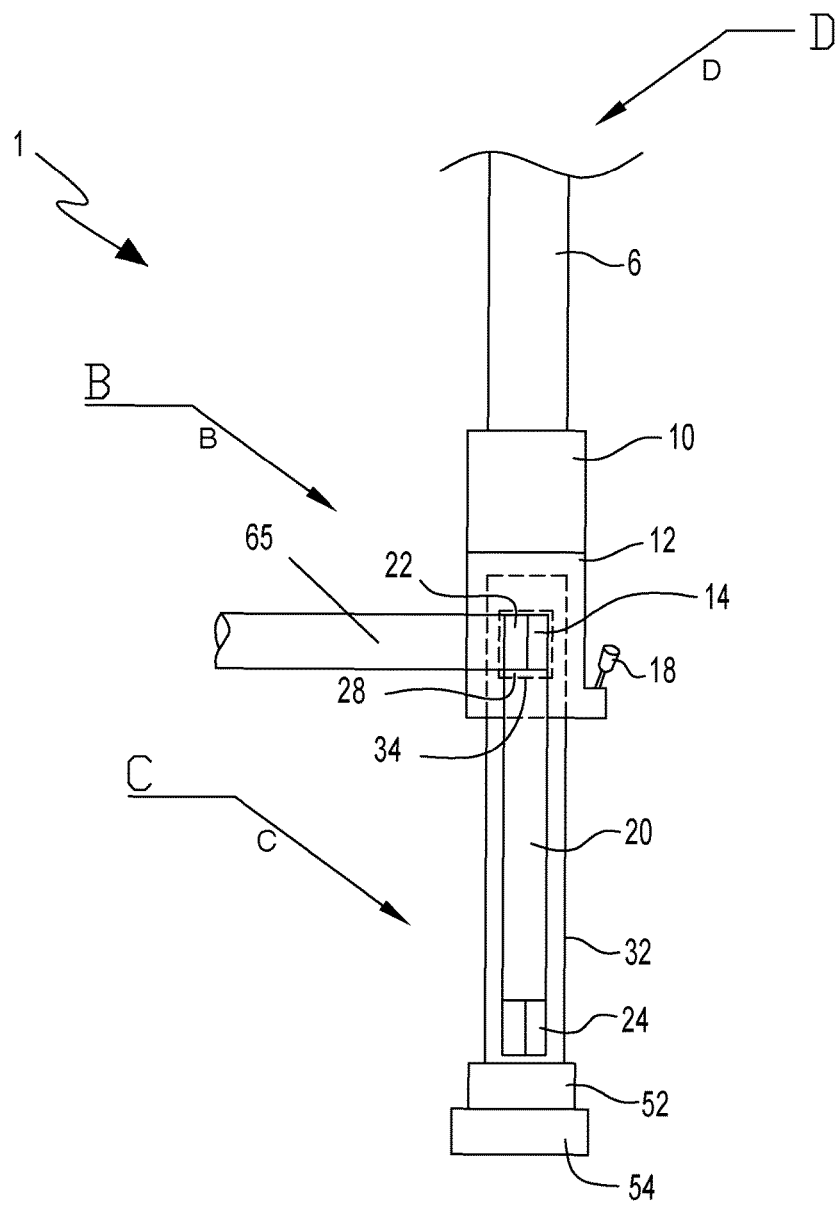
FIG. 5 is a schematic front view of various seat components of the apparatus of FIG. 1, when the apparatus of FIG. 1 is in its normal position.

FIG. 5 discloses one side front view schematic relation apparatus portion D with second portion B and third portion C. Synchronized left components of the apparatus 1 are not shown in FIG. 5. The second portion B includes left second frame 25 (not shown in FIG. 5, but shown in FIGS. 1 and 2 and right second frame 26. The portion C includes left rear frame 19 (not shown in FIG. 5, but shown in FIGS. 1 and 2 and the right rear frame 20. The portion D includes right backrest frame 4 associated with right stabilizer plate 12 of right recliner 10. FIG. 5 illustrates the highest possible location of the right concave 14 of the right stabilizer plate 12 of the right recliner 10. The right recliner 10 is permanently conventionally connected to the backrest right frame 4 associated with right curve frame 6 (not shown in FIG. 5). The right stabilizer plate 12 of the right recliner 10 forms a track allowing portion D to move downward over right rear stationary pillar 32. The rear right stationary pillar 32 performs as a rail to interact with rear right stabilizer plate 12 of right recliner 10 which performs as a track. The right convex 28 of second right frame 26 come together with right concave 34 of rear right stationary pillar 32 and right concave 14 of right recliner stabilizer plate 12. Respectfully, left convex 27 of second left frame 25 controls left concave 13 of left recliner stabilizer plate 11 and left concave 33 of rear left stationary pillar 31 (not shown in FIG. 5). The interaction of the recliner right stabilizer plate 12 with the rear right stationary pillar 32 provides a permanently constant relation of the portion D to portions A, B and C. The interacting of the vertically positioned recliner right stabilizer plate 12 with rear stationary right pillar 32 prevents displacement of the portion D during normal seat position. FIG. 5 illustrates portions A, B and C and D at highest possible location determined by seat height adjuster rear right unit 52 interacting with right member seat horizontal adjuster 54. The left convex 27 having anti-friction left ball bearing 29 (not shown in FIG. 5). The right convex having identical anti-friction right ball bearing 30 (as best seen in FIGS. 3 and 4). The lower region portion D, in at least one embodiment, is permanently conventionally incorporated to corresponding backrest frame seat belt left anchor 19 (not shown in FIG. 5) and to seat belt right anchor 18. The rear right pivot 24 joint height adjuster unit 52 and corresponding rear left pivot 23 joint rear left height adjuster 51 (as best see FIG. 1).

Figure 6:
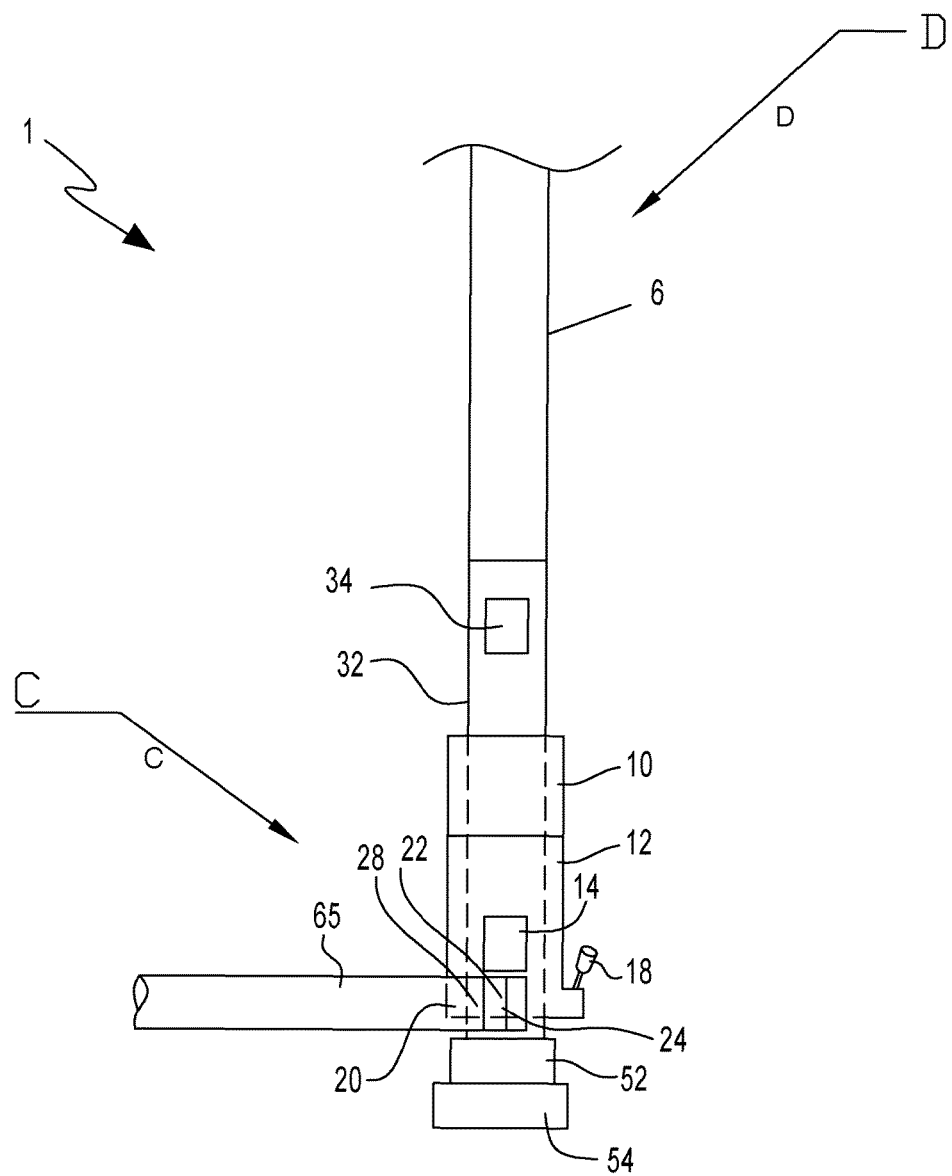
FIG. 6 is a schematic front view of various seat components of the apparatus of FIG. 1, when the apparatus of FIG. 1, is in its deployed position.

FIG. 6 shows a front right schematic side view of major components of the apparatus 1 in the deployed position. The deployed position portions B and shown anticipated deployed location portion D. Simultaneously with energized seat actuator 62 and forced single movable plate 55 to remove from housing 56 the right convex 28 of second right frame 26 is disengaged from the right concave 34 of right stationary pillar 32 and right concave 14 of stabilizer plate 12 right recliner 10. Concurrently, the second frame left convex 27 of second left frame 25 is withdrawing from related concave stabilizer plate 11 of left recliner 9 and from related left concave 27 of left frame 25 (not shown in FIG. 5). Disengagement of convex from concave allows the first portion A, second portion B, third portion C and portion D to change from the normal position or orientation, or state to deployed orientation, position or state. FIG. 6 depicts deployed anticipated position of portion D including deployed location right stabilizer plate 12 of recliner 10 performing as a track to make predetermined downward movement in direction indicate by arrow D1 over rear stationary right pillar 32 functioning rail. Concurrently deployed position portion D left stabilizer plate 11 of left recliner 9 performing track makes downward movement over rear stationary pillar left rail 31 (not shown). The concave 14 stabilizer plate 14 of recliner 10 is moved downward with entire portion D but concave 34 of rear stationary pillar 32 remains in a constant position.

Figure 7:
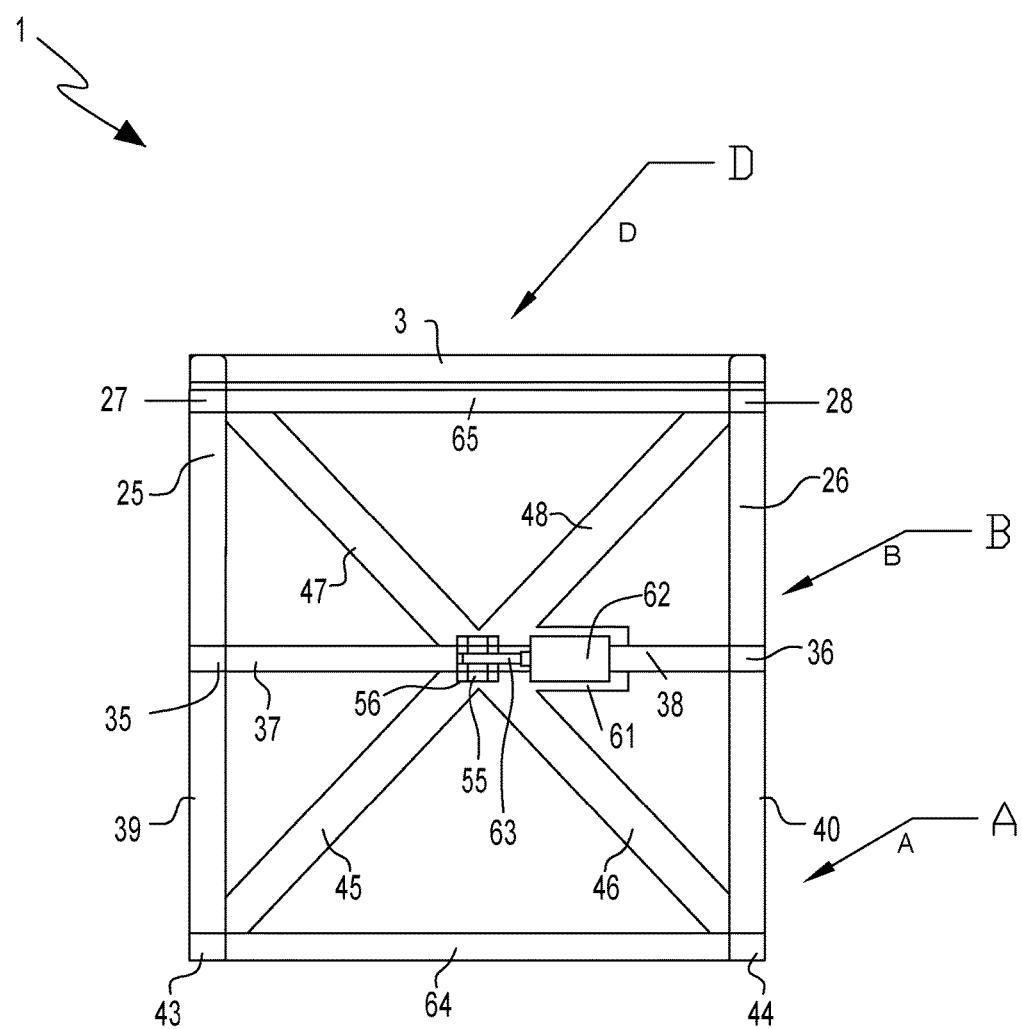
FIG. 7 is a schematic top view of various seat components of the apparatus of FIG. 1, when the apparatus of FIG. 1 is in its normal orientation.
Figure 8:
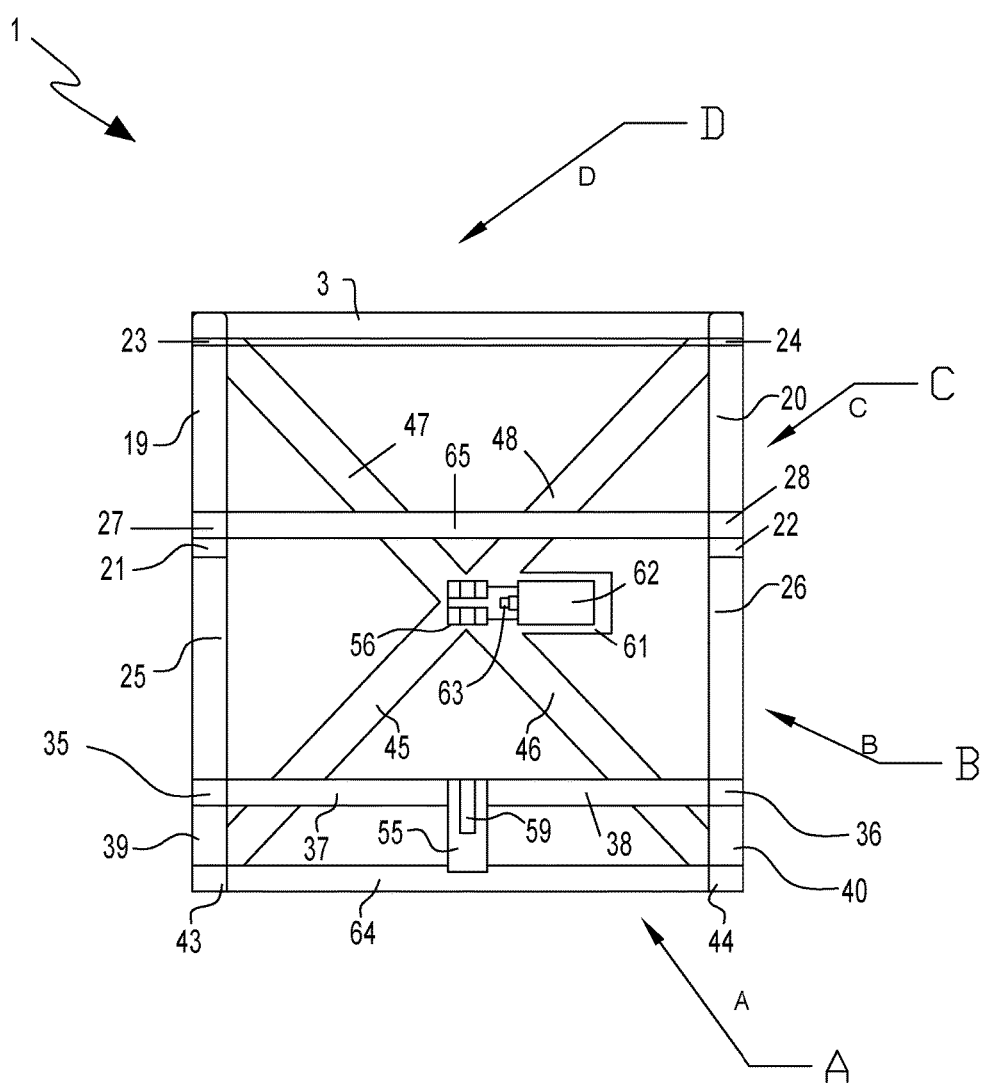
FIG. 8 is a schematic top view various seat components of the apparatus of FIG. 1, when the apparatus of FIG. 1 is in its deployed configuration.

FIG. 7 shown top view of the apparatus 1 and of all portions A, B, C, and D in the normal orientation, position or state, when the actuator 62 is non-energized. FIG. 8 depicts a top view of the apparatus 1 and all portions A, B, C and D when the apparatus is in its deployed configuration when the actuator 62 is energized. The non-energized seat actuator 62 controls movable rigid shaft 63 to fit opening 57 lower end single movable pillar 55 and opening 60 including housing 56 during seat normal position. The seat actuator 62 is permanently conventionally affixed to horizontally positioned component 61 located at centerline X-shaped members front left 45, front right 46, rear left 47 and rear right 48. The component 61 performs base permanently conventionally affixed housing 56 for lower end movable pillar 55 and foundation for linear actuator 62. The first portion A is determined by front cross bar 64, second cross bar left side 37, second cross rod right side 38, left first frame 39, and right first frame 40. The left front pivot 43 and right front pivot 44 hold portion A in motionless normal position and permit portion A to rotate over front cross bar 64 simultaneously with energized actuator 62. The second portion B is determinates by second left frame 20, a second right frame 38, a second cross bar left side 37 and a second cross bar right side 38. The middle left pivot 35 and right middle pivot 36 hold the second portion B in motionless normal position and permit portion B to move downward and forward in combination simultaneously with energized actuator 62. The rear edge of the second portion B includes a rear cross bar 65. The third portion C is determined by a third left frame 19, a third right frame 20. The portion C includes foam cover by lightweight fabric. (not shown). The portion C is held in motionless position by the left third frame 19 having the left upper pivot 21 and the left lower pivot 23 and the right third frame 20 rotatably mounted to right upper pivot 22 pin and right lower pivot 24 pin. During normal position of the apparatus 1 all portions A, B, C and D are motionless at locations conveniently adjusted by seat occupants. For normal seat orientation the third portion C does not participate in occupant's siting position.

FIG. 8 illustrates deployed location portions A, B, C and D when seat actuator 62 is energized. The force, stroke, speed and accuracy actuator 62 is predetermined adequately to particular vehicle seat. The actuator 62 converted indication from collision avoiding detector, acoustic transducer or manually activated potentiometer (not shown) to withdraw the rigid shaft 63 from opening 57 located at lower end movable pillar 55 and opening 60 located at housing 56. Simultaneously with the release of the lower end movable pillar 55 from the housing 56, the movable pillar 55 adjusts its vertical position to deployed configuration. The motion of the movable pillar 55 is exaggerated by torsion spring 59. The first portion A rotates downward in a direction indicated by arrow A1 over front cross bar 64 up to ninety degrees. The second portion B is moved in a direction indicated by arrow B1 forward and downward to follow the second cross bar left side 37 and the second cross bar right side 38. The right convex 28 of the second right frame 26 is disengaged from the right concave 34 rear the right stationary pillar 32 and the right concave 14 recliner stabilizer plate 12 of the right recliner 10. The left convex 27 of the second left frame 25 is disengaged from the left concave 33 of the rear left stationary pillar 31 of the left recliner 9. The third portion C rotates in a direction indicated by arrow C1 from the vertical unseen orientation during normal seat position to horizontal visible location onset seat deployment elongated real siting space.

Figure 9:
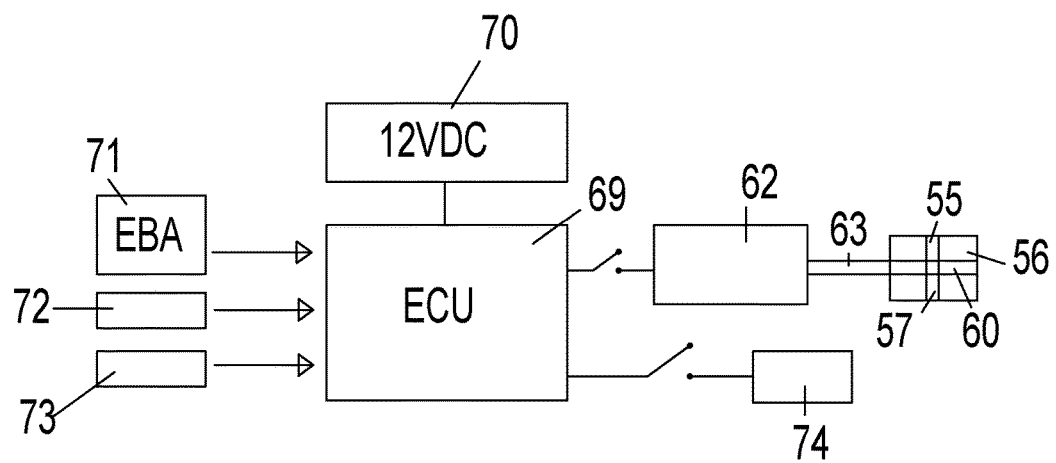
FIG. 9 is schematic diagram circuit wire connection various components of the apparatus of FIG. 1 in its normal orientation.

FIG. 9 depicts a schematic diagram including electronic control unit (ECU) 69 connected with seat actuator 62 in its non-energized normal state. The ECU 69 has 12 VDC (volts direct current) power supply 70. The ECU 69 analog input includes a collision avoidance system, such as emergency braking autonomous (EBA) component 71, ergonomically located push button 72 and audio notification transducer 73. The ECU 69 analog output includes actuator 62 and warning light 64 In case of unusual symptoms as faulty electrical sensor or mechanical issue the ECU 69 activated warning light 74 illuminates on a dashboard (not shown).

Figure 10:
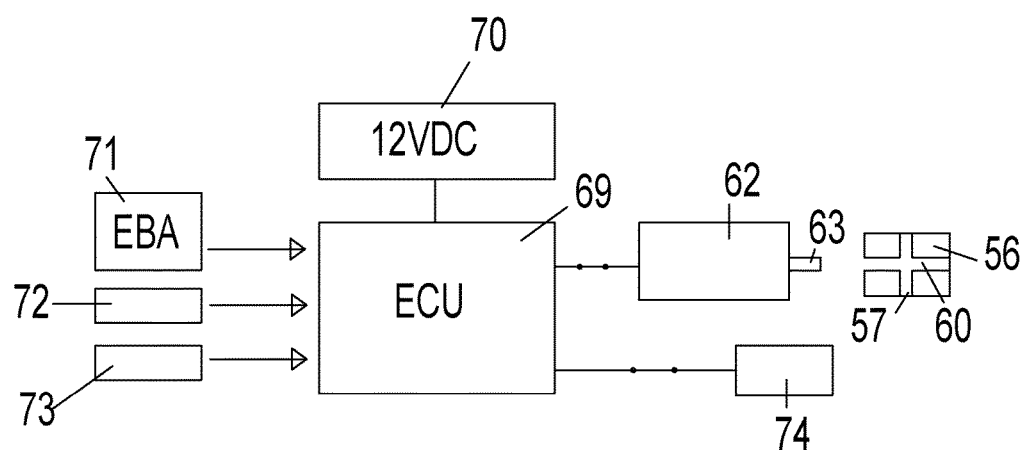
FIG. 10 is schematic diagram circuit wire connection various components of the apparatus of FIG. 1 in its deployed configuration.

FIG. 10 depicts a schematic diagram circuit representing ECU 69 with analog input and output. When a signal is received from at least one of EBA 71 (such as an analog signal), push button 72, or audio notification transducer 73, a command signal is sent to cause seat actuator 62 to energize. Concurrently actuator shaft 63 is pulled out from opening 57 of movable pillar 55 and opening 60 of housing 56. This release single movable pillar 55 causing dislocation of one or more components of the apparatus 1.

Figure 11:
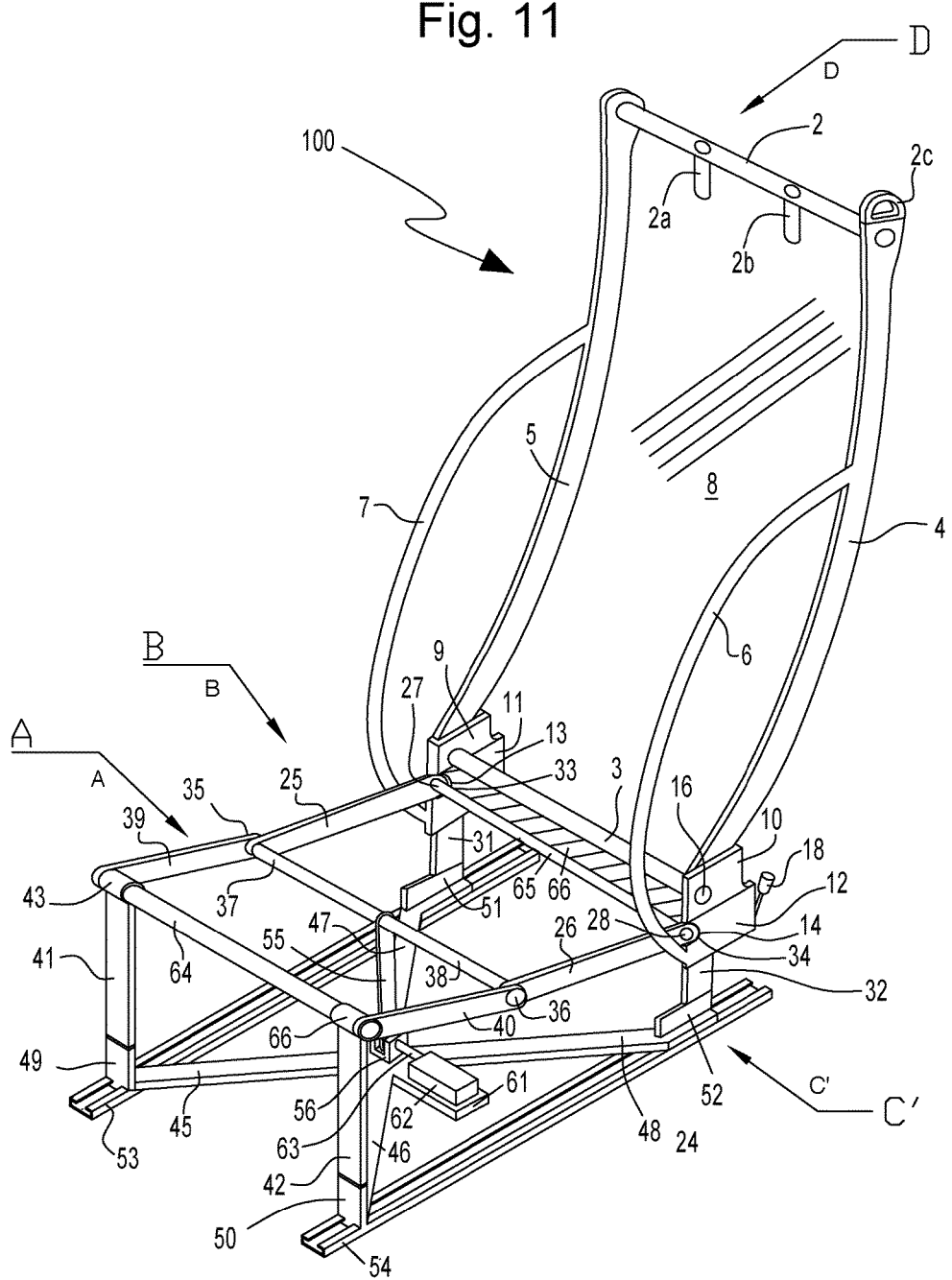
FIG. 11 is schematic perspective view of various components of another apparatus in accordance with another embodiment of the present invention, which is somewhat modified from the apparatus in FIG. 1, wherein the apparatus of FIG. 11 is in its normal orientation.
Figure 12:
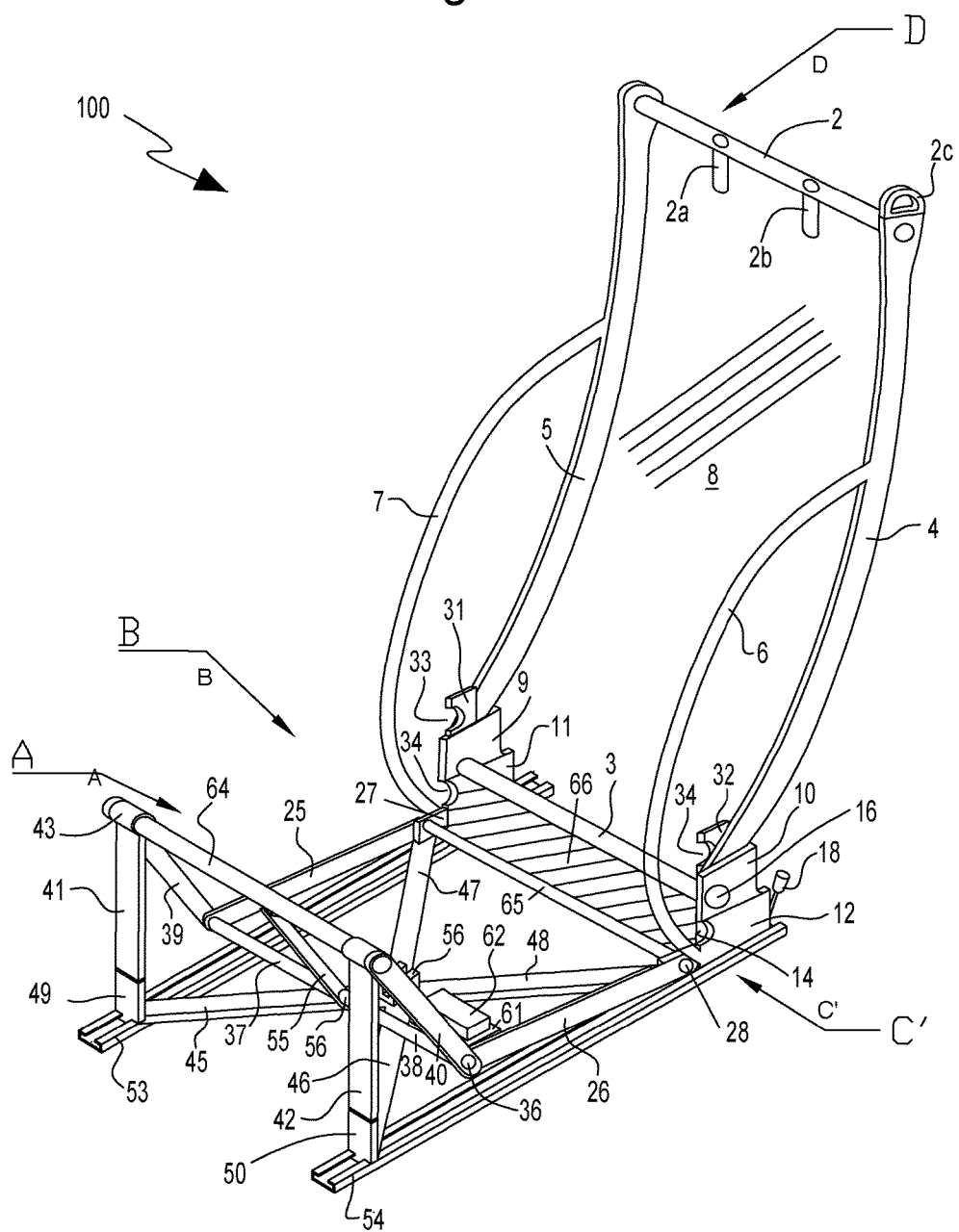
FIG. 12 is schematic perspective view of various components of the apparatus of FIG. 11 when the apparatus of FIG. 11 is in its deployed configuration.

FIGS. 11 and 12 show schematic perspective view of an apparatus or vehicle seat 100, particularly a portion C' formed by fabric or synthetic material 66. FIG. 11 illustrates normal seat location portion C' of seat 100 wherein the fabric or synthetic material 66, replaces metallic seat bottom, including replacing the left third frame 19, left upper pivot 21, left lower pivot 23 as well metallic seat bottom right third frame 20 with right upper pivot 22 and right lower pivot 24. The fabric or synthetic material 66 is connected to the rear cross bar 65 of the seat portion B by the lower cross bar 3 of the backrest D. During normal seat orientation the fabric or synthetic material 66 is folded and hide underneath seat second portion B. Presented portion C' reduces seat weight and cost material and labor by using fabric.

FIG. 12 illustrate portion C' of apparatus or seat 100 formed by fabric or synthetic material 66 when apparatus or seat 100 is in a deployed position. Simultaneously with the activation or energization of the seat actuator 62, the fabric or synthetic material 66 becomes visible, straight, and functional to cover a gap create by the deployed location seat portions B and D.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
a seat bottom which includes a first portion, a second portion, a third portion; and a backrest portion;
a left front pillar;
a right front pillar;
a left rear pillar; and
a right rear pillar;
a left front unit seat height adjuster;
a right front unit seat height adjuster;
a left rear unit seat height adjuster;
a right rear unit seat height adjuster;
a middle unit seat height adjuster; and
an adjustable middle pillar;
wherein a front end of the first portion of the seat bottom is pivotally connected to upper ends of the left and right front pillars;
wherein a front end of the second portion of the seat bottom is pivotally connected to a rear end of the first portion of the seat bottom;
wherein an upper end of the third portion of the seat bottom is pivotally connected to the second portion of the seat bottom;
wherein a rear end of the second portion of the seat bottom is detachably connected to the backrest portion;
wherein the left front pillar and the right front pillar are spaced apart from each other;
wherein a lower end of the left front pillar is fixed to the left front unit seat height adjuster at an orientation and at a position;
wherein a lower end of the right front pillar is fixed to the right front unit seat height adjuster at an orientation and at a position; and
wherein a lower end of the left rear pillar is fixed to the left rear unit seat height adjuster at an orientation and at a position; and
wherein a lower end of the right rear pillar is fixed to the right rear unit seat height adjuster at an orientation and at a position;
wherein the middle unit seat height adjuster is detachably connected to a lower end of the adjustable middle pillar;
wherein the first portion of the seat bottom includes a first left frame and a first right frame, which are spaced apart from each other;
wherein the second portion of the seat bottom includes a second left frame and a second right frame, which are spaced apart from each other;
wherein the third portion of the seat bottom includes a third left frame and a third right frame, which are spaced apart from each other;
wherein a rear end of the first left frame is pivotally connected to a front end of the second left frame at a left middle pivot;
wherein a rear end of the first right frame is pivotally connected to a front end of the second right frame at a right middle pivot;
wherein a left end of a horizontally positioned left cross bar is pivotally connected to the left middle pivot;
wherein a right end of a horizontally positioned right cross bar is pivotally connected to the right middle pivot;
wherein an upper end of the adjustable middle pillar is pivotally connected to a right end of the left cross bar and to a left end of the right cross bar, such that the upper end of the adjustable middle pillar is between the left middle pivot and the right middle pivot; and
wherein the lower end of the adjustable middle pillar, which opposes the upper end of the adjustable middle pillar, is detachable from a base;
wherein when the lower end of the adjustable middle pillar is attached to the base, the second left frame and the second right frame of the second portion of the seat bottom cannot move, except by use of one or more of the left front unit seat height adjuster, the right front unit seat height adjuster, the left rear unit seat height adjuster, the right rear unit seat height adjuster, and the middle unit seat height adjuster; and
wherein when the lower end of the adjustable middle pillar is detached from the base, the second left frame and the second right frame of the second portion of the seat bottom can move in combination downwards towards the base, without the use of any of the left front unit seat height adjuster, the right front unit seat height adjuster, the left rear unit seat height adjuster, the right rear unit seat height adjuster, and the middle unit seat height adjuster.

2. The apparatus of claim 1 further comprising
a seat actuator; and
wherein the upper end of the adjustable middle pillar is pivotally connected to a rear end of the first portion of the seat bottom;
wherein the lower end of the adjustable middle pillar is detachably connected with the base;
wherein when the lower end of the adjustable middle pillar is connected to the base, the adjustable middle pillar is substantially perpendicular to a length of an elongated member of horizontal seat adjuster, when the apparatus is in a normal seat state;
wherein the seat actuator when energized causes the adjustable middle pillar to detach from the base, and to move into a dislocation state where the adjustable middle pillar is substantially parallel to the elongated member of the horizontal seat adjuster;
wherein the seat actuator is in communication with an electronic control unit, and wherein the seat actuator is energized by a command signal from the electronic control unit in response to deceleration of a vehicle which is greater than a limit.

3. The apparatus of claim 2 wherein
the seat electronic control unit communicates with an emergency braking autonomous system, an ergonomically located push button, and an audio notification transducer to energize the seat actuator.

4. The apparatus of claim 2 wherein:
the adjustable middle pillar is detached from the base by causing a rigid shaft pin to withdraw from an opening of the base and from an opening of the lower end of the adjustable middle pillar.

5. The apparatus of claim 1 wherein
the first portion of the seat bottom includes a front cross bar, the left cross bar, the right cross bar;
wherein the second portion of the seat bottom includes a rear cross bar; and
wherein the front cross bar is configured to permit the first portion of the seat bottom and the second portion of the seat bottom to change in orientation from the normal seat state to the dislocation state.

6. The apparatus of claim 5 wherein
the rear cross bar has a convex shaped portion which allows separation of the second portion of the seat bottom from the backrest portion;

wherein the left frame member has a left convex portion, and wherein the right frame member has a right convex portion, and further comprising a left recliner stabilizer, and a right recliner stabilizer;

wherein the left frame member has a convex end which fits into a concave portion of left rear pillar and a concave portion of the left recliner stabilizer;

wherein the right fame member has a convex end which fits into a concave portion of the right rear pillar and a concave portion of the right recliner stabilizer.

7. The apparatus of claim 1 wherein the upper end of the adjustable middle pillar is pivotally connected to the right end of the left cross bar and to the left end of the right cross bar at a location which is approximately at a midpoint between the left middle pivot and the right middle pivot.

8. An apparatus comprising a seat bottom which includes a first portion, a second portion, a third portion; and a backrest portion;

a left front pillar;

a right front pillar;

a base;

a left recliner having an upper end and a lower end; and a right recliner having an upper end and a lower end;

a left backrest frame;

a right backrest frame;

a left recliner stabilizer plate;

a right recliner stabilizer plate;

a left rear pillar;

a right rear pillar;

a left seat belt anchor; and a right seat belt anchor;

wherein the upper end of the left recliner is fixed to the left backrest frame;

wherein the upper end of the right recliner is fixed to the right backrest frame;

wherein the lower end of the left recliner forming the left recliner stabilizer plate detached from left rail rear pillar;

wherein the lower end of the right recliner forming the right recliner stabilizer plate detached from right rail rear pillar;

wherein the left seat belt anchor is fixed to the left recliner stabilizer plate;

wherein the right seat belt anchor is fixed to the right recliner stabilizer plate;

wherein the second portion of the seat bottom has a left convex portion which sits in a concave portion of the left recliner stabilizer plate and a concave portion of the left rear pillar during a normal seat state;

wherein the second portion of the seat bottom has a right convex portion which sits in a concave portion of the right recliner stabilizer plate and in a concave portion of the right rear pillar during a normal seat state;

wherein the left convex portion of the second portion of the seat bottom is out of the concave portion of the left recliner stabilizer plate and out of the concave portion of the left rear pillar during a dislocation state;

wherein the right convex portion of the second portion of the seat bottom is out of the concave portion of the right recliner stabilizer plate and out of the concave portion of the right rear pillar during a dislocation state;

wherein the concave portion of the left recliner stabilizer plate is aligned with the concave portion of the left rear pillar in the normal seat state and not aligned with the concave portion of the left rear pillar in the dislocation state;

wherein the concave portion of the right recliner stabilizer plate is aligned with the concave portion of the right rear pillar in the normal seat state and not aligned with the concave portion of the right rear pillar in the dislocation state;

and wherein the second portion of the seat bottom is closer to the base during the dislocation state than during the normal seat state.

\* \* \* \* \*